L. A. SAUSSARD.
CHANGE SPEED GEARING.
APPLICATION FILED JULY 31, 1908.

932,814.

Patented Aug. 31, 1909.
2 SHEETS—SHEET 1.

WITNESSES

INVENTOR
Louis A. Saussard
BY
Howson and Howson
Att'ys.

L. A. SAUSSARD.
CHANGE SPEED GEARING.
APPLICATION FILED JULY 31, 1908.

932,814.

Patented Aug. 31, 1909.
2 SHEETS—SHEET 2.

WITNESSES

INVENTOR
Louis A. Saussard
BY
Howson and Howson
ATTORNEYS

UNITED STATES PATENT OFFICE.

LOUIS ALCIDE SAUSSARD, OF PARIS, FRANCE.

CHANGE-SPEED GEARING.

932,814.

Specification of Letters Patent.   Patented Aug. 31, 1909.

Application filed July 31, 1908. Serial No. 446,335.

*To all whom it may concern:*

Be it known that I, LOUIS ALCIDE SAUSSARD, a citizen of the French Republic, and residing at 126 Avenue de Versailles, Paris, France, have invented a certain new and useful Change-Speed Gearing, of which the following is a full, clear, and exact description.

This invention relates to an arrangement of change speed gear intended for all industrial applications and more particularly constructed with a view to use upon automobile vehicles.

A description of the invention is given with reference to the accompanying drawings, in which:—

Figure 1:
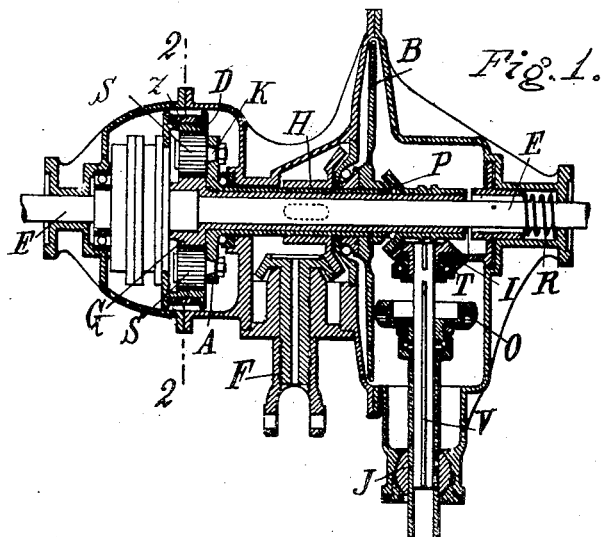
Figure 2:
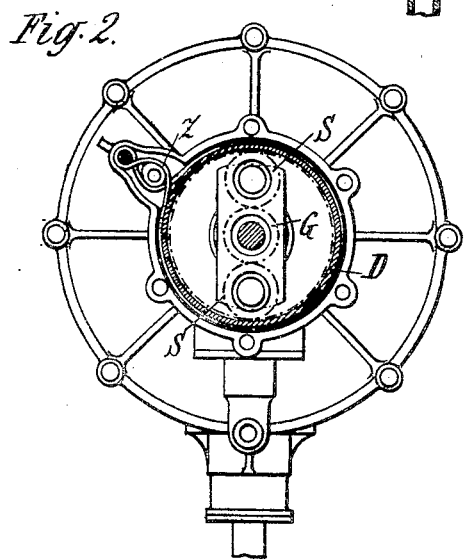
Figure 3:
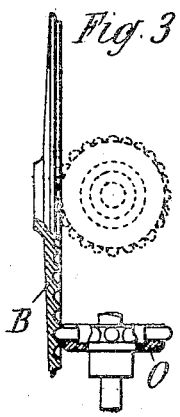
Figure 4:
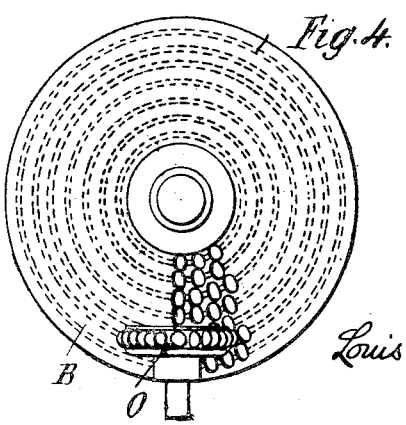
Figure 5:
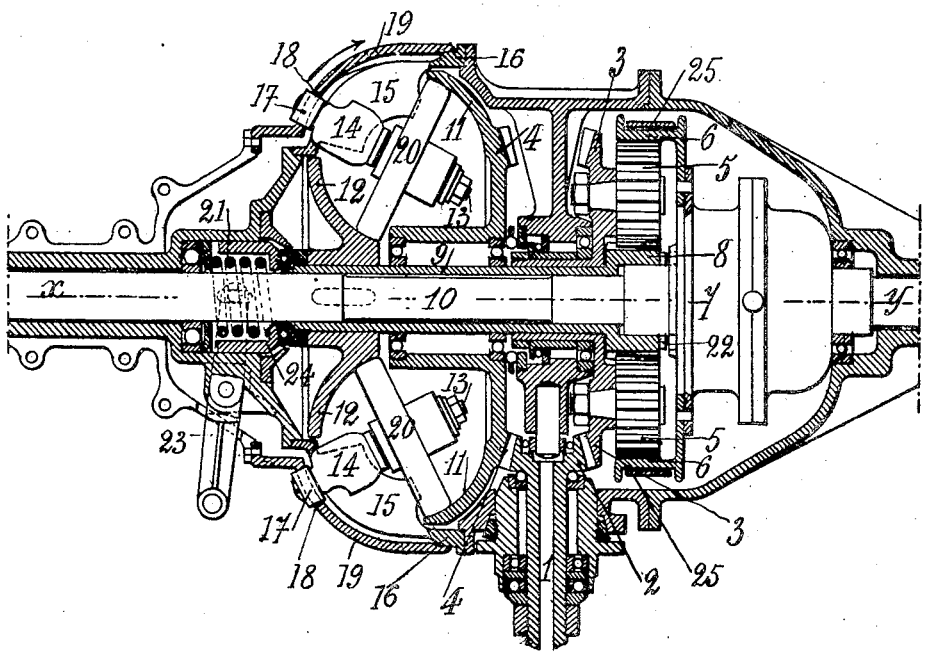

Figure 1 represents in horizontal section, this change speed gear applied to an automobile carriage. Fig. 2 is a section on line 2—2 of Fig. 1. Figs. 3 and 4 show in vertical section and in front view a modification of the driving plate. Fig. 5 is a modification of the arrangement shown in Figs. 1 and 2.

In this mechanism, the variations of speed are progressive both in one direction and the other, and they are obtained by the following arrangement: The driving effort which is transmitted to a shaft F by bevel gear (Fig. 1) is imparted to the plate A by means of a pinion H keyed on a hollow shaft which is fast with the plate A; upon this latter are fixed two axles or spindles K around which revolve the pinions S which engage with an internally toothed crown D and with a pinion G fast with a hollow shaft through which passes the shaft intended to actuate the wheels of the vehicle. To the extremity of the shaft of the pinion G is keyed a bevel pinion P which meshes with another pinion fixed to a shaft V upon which is mounted by means of a long key, a roller O making friction with a steel disk B keyed on the shaft of the plate A.

If it be supposed that the pinion G turns at the same speed as the plate A, the disk B turns at the same speed and the pinions S remaining immovable will drive the differential casing and consequently the axles E upon which the wheels are fixed. If now by the aid of the disk B which causes the roller O to revolve more or less quickly according to its position upon the disk, the pinion G will turn at a speed greater than that of the plate A and the pinions S no longer forming a rigid or locked whole, the crown wheel D will slow down to an extent corresponding to the speed of S; when this latter is equal to that of the crown D, that is to say when the speed relations at A and G are equal to the relation between the pinion G and the crown D, the latter will become motionless. If, however, it be supposed that the pinion G turns still faster, the crown D will be actuated in the opposite direction and that progressively according to the relations of the speeds of A and G.

When the speeds of rotation of the pinion G and of the plate A are equal, the roller O will be placed opposite to a circular cavity or groove formed near the hub of the disk B and will be pushed therein. In this movement the pinion T keyed upon the axle V moves longitudinally, being maintained by a circular guide in the part I, which part is subject to the action of a spring R. The pinion T comprises suitable claws which engage in corresponding notches formed in the shaft of plate A and thereupon the whole is keyed or locked together and turns at the same speed, with the intervening friction of B and O.

If by an arrangement not shown on the drawing, the pinion G is locked against rotation, the speed of E will be augmented by the fraction of the relation existing between the said pinion G and the crown D.

A brake band Z is placed around the crown wheel D and can be applied thereto by means of a pedal or lever.

If the invention is to be fitted to a heavy vehicle, the friction arrangement of B and O is then replaced by the modification shown in Figs. 3 and 4, composed of special pinions; in this case although the change of speed is no longer uninterruptedly progressive, I arrange nevertheless for a larger number of variations or changes than in the ordinary type of apparatus since I can obtain eight speeds forward and two reverse.

In the arrangement shown in Fig. 5 the roller and flat friction plate, serving to impart a variable speed to the central pinion of the planet gears, is replaced by a system of friction rollers traveling upon the curved surfaces of two plates which have a cup and cone shape; instead of causing the friction roller to slide along a radius of the flat plate to change the relation of transmission I now make the rollers oscillate in such a way that they roll upon the cup and cone in circles of different diameters. I thus obtain the same results as before but with a more compact construction which is at the same time stronger and easier to make. A form of carrying out this improved arrangement of the apparatus is shown by way of example in horizontal section on Fig. 5 of the annexed drawing. The driving shaft is shown at 1 carrying a pinion 2 which meshes with two conical wheels 3 and 4 so as to revolve them continually at equal speeds in opposite directions. The wheel 3 carries planetary pinions 5 which engage on the one hand with an internally toothed wheel 6 fast with the casing 7 of the differential and on the other hand with a central pinion 8 which is fast with a hollow shaft 9 along and within which passes one of the shafts 10 of the differential. The wheel 4 is provided with a crown having a curved profile or "cup" 11 while the hollow shaft 9 is furnished with a plate having a curved profile or "cone" 12, the surfaces of this cup and of this cone coinciding with that of an ideal tore which would be placed concentrically with the shaft. Between the cup and the cone are arranged a number of friction rollers 20 turning upon axles 13 of which the directions converge toward the axis $x-y$ of the shaft 9 into the same point situated at a variable distance; these axles are fast to pillars 14 guided by slides 15 secured to the casing of the apparatus, so that these pillars can move in arcs of a circle in radial planes which pass through the axis $x-y$. Each pillar 14 is provided externally with a roller 17 which is engaged in a groove 18 of a cap 19 mounted upon the casing in such a way as to be able to revolve through a certain angle. The grooves 18 are set obliquely relatively to the slides 15 so that in turning the cap 19 the pillars 14 are forced to move in these slides and consequently the inclination of the rollers 20 is altered. The hollow shaft 9 can slide upon the shaft 10 and is pushed back by a spring 21 so as to maintain a suitable adherence between the cone 12, the rollers 20 and the cup 11. Besides, the (on the drawing) right hand end of the hollow shaft 9 carries clutch jaws 22 which can engage between corresponding jaws on the wheel 6. In order that this clutch may operate, the central part of the cup 11 is fitted with a small cut away portion into which the rollers 20 enter when they are brought a little beyond the horizontal position, thus permitting the cone 12 to advance toward the right under the action of the spring 21. A forked lever 23 acting on the movable casing 24 which incloses the spring 21 allows of dispensing when necessary, with the action of this spring in order to facilitate the manipulation of the rollers 20 when their inclination is changed, especially when the apparatus is at rest.

The working of this arrangement of change speed gear is substantially the same as that described for the apparatus shown in Figs. 1 and 2. When the axles of the rollers 20 are inclined toward the axis $x-y$ so that they bear against the small end of the cone 12 the rollers cause the cone 12 and consequently the pinion 8 to turn at a speed equal to that of the wheel 4 and in the opposite direction, that is to say at a speed equal to that of the wheel carrying the planets 3 and in the same direction. The wheel 6 then turns solidly with the planetary pinions. If the rollers 20 are brought a little beyond this position in the direction of the arrow indicated on the drawing, these rollers are put out of action and the jaws 22 engage, as above indicated, with the wheel 6 so that the differential is then rotated by direct drive. When the rollers 20 are inclined in the opposite direction to the arrow, the cone 12 receives an angular speed greater than that of the cup 11 so that the pinion 8 is obliged to turn more quickly than the wheel 3 carrying the planets and imparts to these planets 5 a backward movement around their axles, and this has for effect to reduce the speed of the wheel 6 and of the differential 7. When the rollers 20 attain the extreme position shown on the drawing, the speed of the pinion 8 is such that the direction of rotation of the wheel 6 is reversed. The apparatus thus permits by the simple manipulation of the cap 19, to pass in a continuous manner through all the possible proportions of transmission from the highest speed forward in direct drive down to reverse drive. The brake band 25 is placed around the wheel 6 and is intended to be applied by means of a pedal; this brake permits of moderating the speed of the driven shafts independently of the transmission relation.

Having thus described my invention what I claim as such and desire to secure by Letters Patent is:—

1. In a change speed gearing, driving and driven shafts, a differential casing mounted on said driven shaft, an internally toothed crown fast on said casing, planetary pinions engaging said crown, a shaft concentric with the driven shaft, spindles for said planetary pinions carried thereby and means for actuating said shaft from the driving shaft, in combination with a central pinion engaging said planetary pinions, a rotary member driven by the driving shaft and means in connection therewith for driving said central pinion at varying speeds.

2. In a change speed gearing, driving and driven shafts, a differential casing mounted on said driven shaft, an internally toothed crown fast on said casing, planetary pinions engaging said crown, a shaft concentric with the driven shaft, spindles for said planetary pinions carried thereby and means for actuating said shaft from the driving shaft, in combination with a central pinion engaging said planetary pinions, a rotary member driven by the driving shaft and means in connection therewith for driving said central pinion at varying speeds together with means for rendering said central pinion rigid with relation to said rotary member at predetermined speeds.

In testimony whereof I have signed my name to this specification, in the presence of two subscribing witnesses.

LOUIS ALCIDE SAUSSARD.

Witnesses:
LEVI FRANCKEN,
M. B. KIRK.